UNITED STATES PATENT OFFICE.

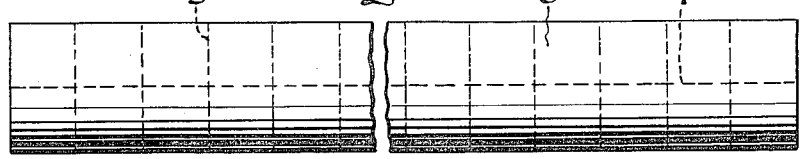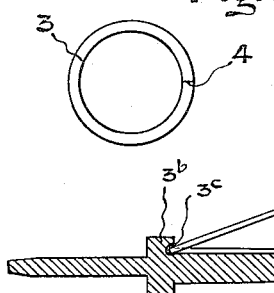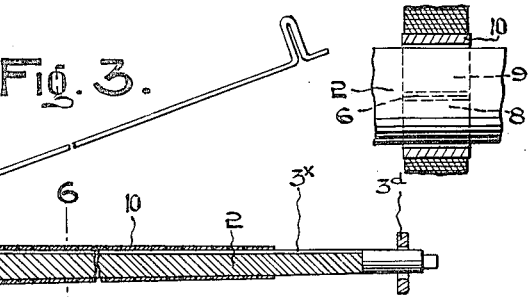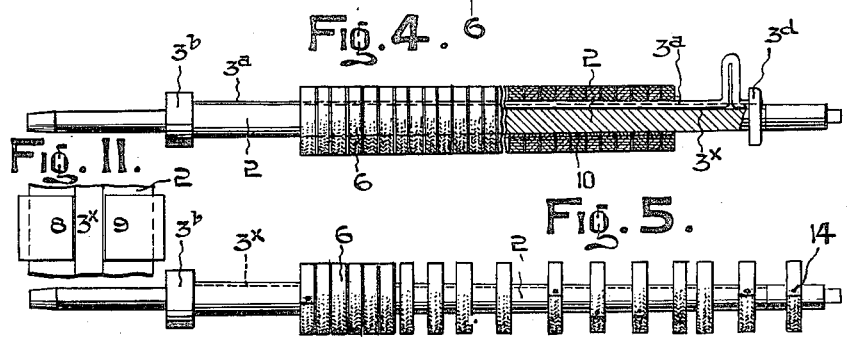

EDWIN F. TOMKINS, OF COATICOOK, QUEBEC, CANADA.

MEANS FOR WINDING AND CARRYING TAPE, BRAID, AND THE LIKE.

1,261,872.  Specification of Letters Patent.  Patented Apr. 9, 1918.

Application filed May 25, 1917. Serial No. 170,914.

*To all whom it may concern:*

Be it known that I, EDWIN F. TOMKINS, of Coaticook, Province of Quebec, Dominion of Canada, superintendent, have invented certain new and useful Improvements in Means for Winding and Carrying Tape, Braid, and the like; and I do hereby declare that the following is a full, clear, and exact description thereof.

My invention relates particularly to the winding of predetermined lengths of tape, braid and the like, and devices on which these wound lengths remain mounted when supplied to the trade for the purpose of facilitating the manipulation of the tape, braid and the like.

Heretofore it has been the practice to use rigid spools or tubes to each of which one end of the braid or other flexible length to be wound thereon is fastened by gluing or pinning it in some other manner; but there has been considerable disadvantage when the end is glued owing to the fact that sufficient time had to elapse to allow the joint between the braid and the collar to dry before the winding could be commenced. With all the other methods of fastening more than one roll could not be wound at a time. For the winding of wider fabrics split rolls or cylinders had to be used with which it was necessary to employ pins to be inserted through the end of the fabric after it was passed through the split, and in other cases a metallic strip was inserted into a pocket or hem at one end of the fabric such end being in turn inserted into a slit in the shell or cylinder through either end of the latter. The same disadvantage was experienced with these alternative forms when applied to the winding of tape, braid or other narrow fabrics and the factories manufacturing them have practically invariably returned to the use of the rigid unbroken ring with one end of the tape glued to the outside of its perimeter.

My invention has for its object to provide an attachment to a winding machine by which any desired number of rolls mounted on annular carriers may be wound simultaneously with minimum loss of time, each roll having a firm core or carrier adapted to facilitate manipulation of the tape, braid or the like after being supplied to the trade.

To this end the invention may be said to consist of the combination with a winding cylinder, of a series of resilient open rings or collars clasping the cylinder and adapted to receive a folded end of the tape or the like and which when removed from the cylinder grips the folded end. The tape is held in the slit in the collar during the winding operation by a rod removably seated in a groove in the cylinder. In the preferred embodiment of my invention I employ a series of these rings or collars with a single cylinder rod and provide as many rings or collars as there may be lengths of tape or the like to be wound.

For full comprehension, however, of my invention, reference must be had to the accompanying drawings in which similar reference characters indicate the same parts, and wherein:

Figure 1 is an elevation of a blank from which my improved ring or collar is formed;

Fig. 2 is an end view thereof;

Fig. 3 is a longitudinal sectional view of a winding cylinder with a series of my improved rings or collars slipped thereon, the rod being in position ready to hold the tape, braid, etc., between the jaws of the rings or collars.

Fig. 4 is an elevation, partly in sectional view, of the winding cylinder, the rings or collars being fully wound;

Fig. 5 is a similar view to Fig. 4 with the rod removed and some of the wound rings or collars slipped from place and others partially displaced;

Fig. 6 is a transverse sectional view taken on line 6—6 Fig. 3;

Fig. 7 is a sectional view similar to Fig. 6 and illustrating the manner of clamping the initial end of the tape or braid upon the cylinder;

Fig. 8 is a plan view thereof;

Fig. 9 is an elevation of a roll of tape wound according to my invention and ready for use by the consumer;

Fig. 10 is a part elevation and part sectional view of one roll of tape just before it is removed from the cylinder and illustrating the ends of the ring or collar in relative clamping position; and Fig. 11 is a fragmentary plan view of a ring or collar illustrating the manner in which the ends of the latter are spread apart during the winding operation.

The cylinder is indicated at 2, and the groove $3^x$ therein has a rod $3^a$ removably held therein by a rigid collar $3^b$ near one end having a socket $3^c$ and a movable collar $3^d$ near its opposite end. This cylinder is tapered toward the end bearing the removable collar $3^d$.

The ring or collar is cut from a tube preferably consisting of wound and glued paper or other suitable semi-rigid material which has a certain amount of resiliency when the tube is slit in a line parallel to its axis. This tube is indicated at 3 and the slit at 4. The rings are produced by dividing this tube transversely at 5; the widths of the rings being dependent upon the width of the tape or other fabric to be wound thereon.

The tape or other fabric to be wound is indicated at 6 and the jaws presented by the slit in the ring are indicated at 8 and 9 while the body of the ring or collar is indicated at 10.

These rings or collars are of a circumferential length to, when slipped into the cylinder, open sufficiently to have their jaws located at the opposite sides of the groove $3^x$; and the groove is of such a depth that the top of the rod will extend outside of the circumference of the cylinder and prevent the rings or collars from turning thereon.

In order to wind lengths of tape or other fabric on my improved rings or collars one end of each tape is laid across the open slit in one of the rings and the end of the rod is then inserted in a socket in the rigid collar and it is pressed down into the groove taking the position of the tape extending over the open slits, into the groove and holding them firmly in place. The movable collar is then slipped over the free end of the rod and thereby locked. When the desired lengths have been wound on my rings or collars, the collar $3^d$ is removed and the rod withdrawn after which the resilient rings or collars are slid off the cylinder and as they approach the smaller end of the latter they gradually close until, when just before leaving the cylinder the slit closes and the jaws grip the folded end of the tape and retain it firmly.

When predetermined lengths have been wound in this manner they are cut, turned in and pinned as at 14 (Fig. 7), after which they are ready to be supplied to the trade.

Although my improved carrier for tape, braid and the like has a certain amount of resiliency before being wound, it presents a rigid support for the wound length owing to the fact that the strip of fabric clamps the sides or jaws of the slit rigidly together and its annular form affords the necessary resistance to the centripetal force of the wound fabric.

The carriers are preferably made of glued laminæ of paper as above described, but if desired may be made of pulp board or other suitable light-weight and non-metallic material; and although I prefer a fibrous material they may be made of metal or any other more or less resilient material without departing from the spirit of my invention.

What I claim is as follows:—

1. The combination with a winding cylinder, of resilient annular carriers each being slitted parallel to its axis, means retaining an end of tape, braid or the like within the slits during the winding operation, the said means being removable after the completion of the winding operation and the annular carriers being adapted to contract and grip the inserted ends of the tape, braid or the like and retain the same after the wound carriers have been removed from the cylinder.

2. The combination with a winding cylinder, of a series of resilient open rings or collars clasping the cylinder and each adapted to receive a folded end of tape, braid or the like, means preventing the rings or collars from turning on the cylinder, the said rings or collars being adapted, when removed from the cylinder, to contract and grip the said ends of the tape, braid or the like.

3. The combination with a winding cylinder having a longitudinal groove in its perimeter, of a series of resilient open rings or collars clasping the cylinder and each adapted to receive a folded end of tape, braid or the like, a rod passed laterally through the openings in the rings or collars and seated in the groove with its perimeter extending outside of the circumference of the cylinder and preventing the rings or collars from turning on the cylinder, the said rings or collars being adapted, when removed from the cylinder, to contract and grip the said ends of the tape, braid or the like.

4. The combination with a tapered winding cylinder, of a series of resilient annular carriers for the rolls of tape, braid or the like, the said carriers being adapted to be slipped on to the cylinder and expanded thereby to receive the tape, braid or the like, and when removed from the cylinder, contract and grip the said ends.

5. The combination with a tapered winding cylinder having a longitudinal groove in its perimeter and a rod adapted to be removably seated in the groove with its top extending outside of the circumference of the cylinder and a series of removable resilient open rings of less length than and clasping the circumference of the portion of the cylinder of greater diameter with the jaws formed by the openings in the rings located at opposite sides of the groove; and means for inserting the ends of lengths of tape, braid or the like to be wound between the jaws to be gripped thereby when removed from the cylinder.

6. As an article of commerce a resilient open ring equal in width to the tape, braid or the like to be wound thereon, the jaws of the ring being adapted to grip one end of the tape, braid or the like between their ends for the purpose of positively uniting the ring and tape, braid or the like until the latter is completely unwound therefrom In testimony whereof I have signed my name to this specification in the presence of two witnesses.

EDWIN F. TOMKINS.

Witnesses:
GORDON G. COOKE,
WILLIAM J. C. HEWETSON.